(12) United States Patent
Shub et al.

(10) Patent No.: US 6,807,530 B1
(45) Date of Patent: Oct. 19, 2004

(54) METHOD AND APPARATUS FOR REMOTE COMMERCE WITH CUSTOMER ANONYMITY

(75) Inventors: Michael Shub, New York, NY (US); Charles Philippe Tresser, Mamaroneck, NY (US); Chai Wah Wu, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/129,826

(22) Filed: Aug. 5, 1998

(51) Int. Cl.[7] .............................................. G06F 16/70
(52) U.S. Cl. ........................................... 705/1; 705/26
(58) Field of Search ............................ 705/1, 26, 37, 705/39, 40; 380/23, 25, 24

(56) References Cited

U.S. PATENT DOCUMENTS

| | | | | |
|---|---|---|---|---|
| 5,420,926 A | * | 5/1995 | Low et al. ..................... | 380/24 |
| 5,557,518 A | * | 9/1996 | Rosen .......................... | 380/24 |
| 5,671,279 A | * | 9/1997 | Elgamal ....................... | 380/23 |
| 5,732,400 A | * | 3/1998 | Mandler et al. .............. | 705/26 |
| 5,768,385 A | * | 6/1998 | Simon .......................... | 380/24 |
| 5,790,677 A | * | 8/1998 | Fox et al. ..................... | 380/24 |
| 5,794,207 A | * | 8/1998 | Walker et al. ................ | 705/23 |
| 5,812,670 A | * | 9/1998 | Micali .......................... | 380/25 |
| 5,903,878 A | * | 5/1999 | Talati et al. .................. | 705/26 |
| 5,903,882 A | * | 5/1999 | Asay et al. ................... | 705/44 |
| 6,006,200 A | * | 12/1999 | Boies et al. ................. | 705/26 |
| 6,748,366 B1 | * | 6/2004 | Hurwitz et al. .............. | 705/53 |

FOREIGN PATENT DOCUMENTS

| | | | | |
|---|---|---|---|---|
| WO | WO 97/10560 | * | 3/1997 | ........... G06F/17/60 |
| WO | WO 97/25801 | * | 7/1997 | ............. H04L/9/32 |

OTHER PUBLICATIONS

"Anonymous Deliver of Godds in Electronic" IBM Technical Disclosure Bulletin, Mar. 1, 1996, V 39, I 3. pp 363–366.*

* cited by examiner

Primary Examiner—Yehdega Retta
(74) Attorney, Agent, or Firm—Whitham, Curtis & Christofferson, P.C.; Stephen C. Kaufman

(57) ABSTRACT

A method and apparatus which enables customers to remotely order goods from a merchant and receive the goods without revealing customer identity or address to the merchant, nor revealing what is bought to the bank or payment agency, and more generally to preserve as much anonymity as required such that no party except the customer has complete information about a transaction. The method uses clearing houses or encryption to break links between customer information and the merchant.

12 Claims, 4 Drawing Sheets

METHOD AND APPARATUS FOR REMOTE COMMERCE WITH CUSTOMER ANONYMITY

BACKGROUND OF THE INVENTION

1. Field of the Invention

The present invention generally relates to techniques for controlling and limiting the flow of identification information in a commercial transaction, and more particularly to a method and apparatus which enables customers to remotely order goods from a merchant and receive the goods without revealing the customer's identity or address to the merchant.

2. Background Description

In classical retail commerce, the customer could go to a store, pay cash, and carry out the purchased goods without disclosing identification information such as name or address, in short, while totally preserving customer anonymity.

Electronic commerce now allows customers to make purchases while at home or other convenient location from merchants located in a variety of locations, but often at the price of losing customer anonymity. Although remote commerce is now made easy by the World Wide Web, a huge number of potential customers do not participate in this commerce because they are afraid that their participation would mean that they would be included in databases maintained and marketed by the merchant for a variety of commercial purposes without the knowledge or consent of the customer. That is to say, the so-called "big brother" and invasion of privacy syndromes worry more and more potential electronic business users, thus limiting the expansion of electronic and other forms of remote businesses.

It is thus important to have means to sell goods through the Internet without invading the privacy of the customers and even better preserving their anonymity.

Similar problems have been resolved where information, data (and, more generally, material which can be transferred in electronic form on the Internet) is purchased. One example is given by the NetBill Security and Transaction Protocol by B. Cox, J. D. Tygar, and M. Sirbu which can be obtained on the Internet.

However, these solutions do not apply where we are concerned with traditional goods which have to be shipped to the customer. Besides customer anonymity, there is a need for making sure that all services and goods are paid for in a secure way and orders can be confirmed, without much alteration to traditional distribution channels which have proven efficient and with which most merchants feel comfortable.

SUMMARY OF THE INVENTION

The present invention presents a method and apparatus to solve this problem, and more generally the problem of preserving anonymity in all sorts of remote commerce, as long as the connection line between the customer and the merchant allows the transfer of a few numbers, letters, or other symbols: thus, besides the Internet, the invention also applies to phone and mail orders.

It is therefore an object of the present invention to provide mechanisms for remote commercial transactions, such that customer identification information need not be disclosed to the merchant nor to anyone (other than the customer) who knows what is bought by the customer.

It is a further object of the invention to be operable with existing commercial distribution channels, with which merchants are already familiar.

The main principle of the invention can be understood as a two stages process.

A) In the first stage, protocols are established among prospective customers, payment agencies, merchants, clearing houses, and delivery companies which guarantee that they will protect the privacy of the transaction, which is in any case already protected by the fact that no party to the protocol has complete information about the order except the customer, i.e. except for the customer, nobody knows both the identity of the customer and what is bought in the transaction. The essence of these protocols will be evident from the description given below of how the global system works in the second stage in the preferred embodiments. Such protocols will be called Anonymous Customer Protocols (ACP).

A') Alternatively, in the first stage, protocols are established among prospective customers, payment agencies, merchants, printer service companies, and delivery companies which guarantee they will protect the privacy of the transaction, which is in any case already protected by the fact that no party to the protocol has complete information about the order except the customer. Again, the essence of these protocols will be evident from the description given below of how the global system works in the second stage in the preferred embodiments. The alternate solution does not use clearing houses but uses encryption. A private key/public key pair and a secret encoding key will be used in this invention. The use of private key/public key pairs and the use of secret encoding keys are now well known: a description of these techniques with directions on how to use several of their implementations can be found in "Handbook of applied Cryptography," by Alfred J. Menezes, Paul C. van Oorschot and Scott A. Vanstone, CRC Press, 1997 and "Cryptography: Theory and Practice," by D. R. Stinson, CRC Press, 1995.

B) In the second stage, transactions and the transfers of goods take place which involve all parties we have mentioned in A) above. Two clearing houses, one dealing with data, the other with goods, break all chains so that an employee of a bank or of one of these clearing houses has to collaborate with some other party for the link between the customer and the merchants to be accessible. Even that is impossible if the customer takes some extra steps such as not using her/his bank or credit card accounts and using a remote delivery address.

B') Alternatively, in the second stage, transactions and the transfers of goods take place as follows: the customer gives the order, some code numbers and the identity of the chosen payment agency to the merchant. The merchant communicates an order number to the customer, to the payment agency (which authenticates the numbers furnished by the customer and agrees to pay the merchant), and to its warehouse and/or manufacturing services. The customer has the option to request that the order be delivered to an alternate address in which case the payment company needs to contact the customer with the order number and obtain the shipping address. The payment company might also send the Zip code of the customer to the merchant for determining shipping and handling charges. The package(s) is prepared by the merchant while the payment agency commands the printer to print an address label that the merchant can associate with the order (using the public key) but cannot read otherwise (except possibly for very vague data which cannot identify the customer better that revealing her/his Zip code). Once the label is attached by the merchant to the package, it is handed to the delivery company which acknowledges receipt, and rips off some foil covering the readable address in Option 1, or in the case of Option 2 reads some code, decodes it using the secret encoding key to obtain a readable address which is then printed. The package and label can be such that the local delivery agent cannot identify the merchant. The package and label can also be such that the delivery company cannot know the precise content of the package.

In case the customer wants more anonymity, the delivery can also be made to the payment agency, some post office box, or a separate agent: such extreme cases lead in fact to easy solutions to the anonymity concern because the lack of access of the merchant to the printer is no longer required. However, since such solutions involve considerably more time loss for the customer, they are less acceptable than the present invention as a general solution to the anonymity protection problem.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
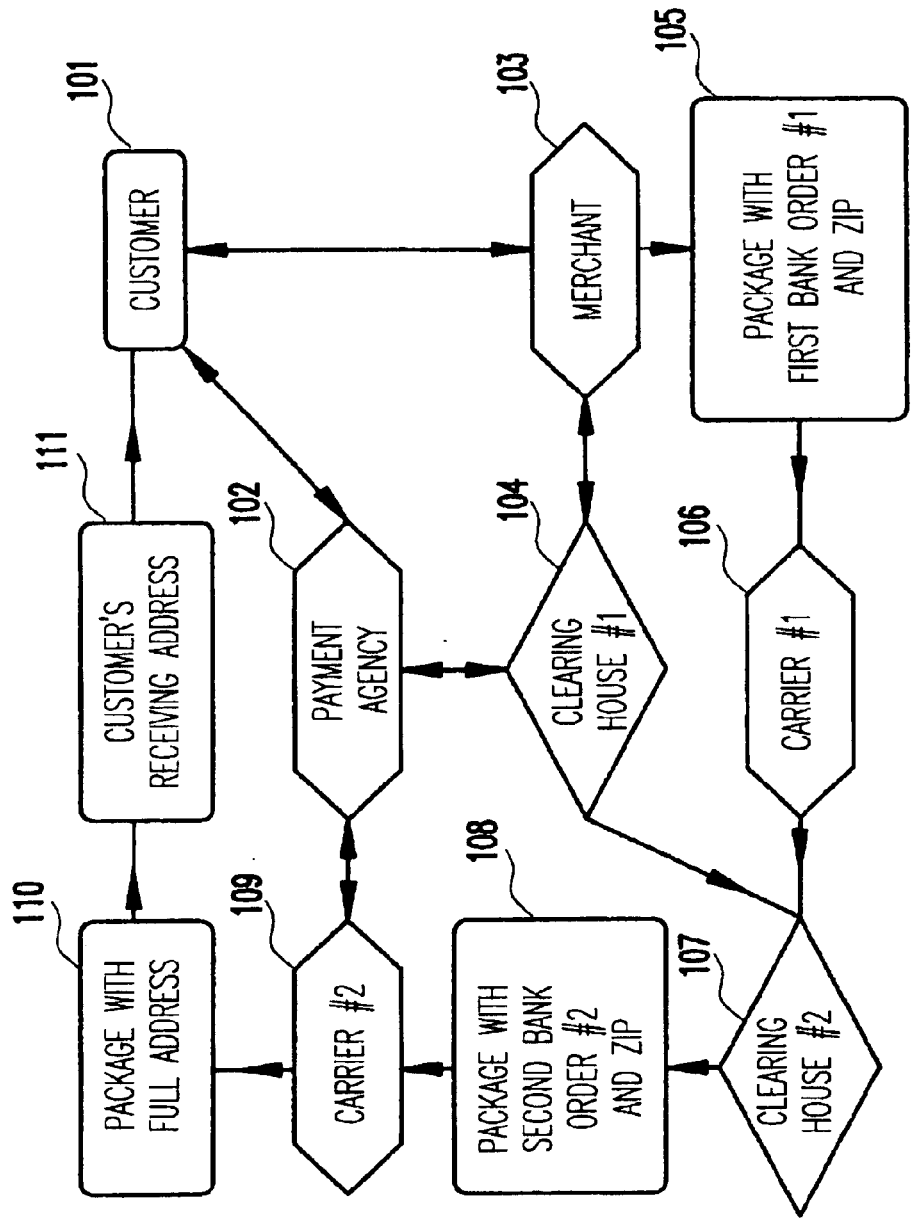
FIG. 1 is a flow chart describing the various links involved in the invention.

Referring now to the drawings, and more particularly to FIG. 1, there is shown a flow chart describing the various links involved in the invention. A preferred embodiment can be described as follows:

Before processing an anonymous buy, the customer 101 gets from some payment agency 102 a customer number c and a transaction private number t which allows her/him to make a purchase from a remote merchant participating in an Anonymous Customer Protocol (or ACP). The customer 101 can also receive a sequence of such transaction private numbers allowing her/him to perform several buys, and can also get new numbers whenever needed. The customer 101 also receives from the payment agency 102 a third number p called the privacy number to allow her/him to make inquiries. In the description to follow, it is assumed that all parties, except the customer, have decided to participate in an ACP (and have made public that choice). By this we mean they will play their role in the scenario we will describe, and guarantee that they, as companies, and their employees, will behave with discretion, and not try to abuse the system.

The protocol we describe is such that, except for the customer, no party (employee or company) ever possesses all the information necessary to link the customer to the merchant. The system is also such that some complicity of at least one employee of one of the clearing houses or the customer's bank with at least one employee of some other party is needed for the link between the merchant and the customer to be revealed. As secrecy is the main business of the clearing house as far as the participation in the protocol is involved, and such discretion is part of what is expected from banks, their discretion should be considered as reasonably reliable.

Where there is increased need for anonymity, proper choice of payment agency and delivery address can be used to enhance anonymity, as will be described below. In other situations, the present invention will allow the customer to get involved in remote anonymous commerce with the same comfort as traditional remote commerce, and with no additional inconveniences nor need of new business partners, as long as her/his bank and/or credit card issuer participate in an ACP.

Clearly, if the customer 101 so desires, she/he can ask the merchant 103 to only use some simplified version of the protocol, in particular avoiding one of the clearing houses 104 and 107 whose role will be described below. The payment agency 102 can be the bank and/or credit card company of the customer 101, but can also be a specialized agency, where the customer 101 pays cash in exchange for a receipt and the numbers c and t. In all cases, the customer 101 gives the payment agency 102 some receiving address 111 where the goods she/he buys will be delivered. In many cases, the address 111 will be the home of the customer, but this is not necessary. For example, the "address" can be a third party, such as an agent or a delivery service, rather than a physical location, so that the payment agency 102 need not know the identity or address of the customer 101.

To perform a buy, the customer 101 contacts the merchant 103 and, when placing an order, gives the merchant 103 the pair of numbers (c, t) and the identity of the payment agency 102. It is usually considered that the Internet will be used to protect the anonymity of the customer 101, but machines with which customer 101 has no formal recognizable link may also be used, such as a public telephone, a letter, etc. We write S for the cost of the total transaction, including merchandise M and transport, packing and handling (in short TPH). So S is the sum of the price s(M) of the merchandise and of the price s(TPH) of TPH. The portion s(TPH) will depend on options offered to the customer such as extra repackaging by the second clearing house or reduced protocol.

The merchant 103 then contacts the first clearing house at 104. Merchant 103 tells first clearing house 104 the pair (c, t), the name of payment agency 102, and the amount S.

After making itself recognized as a participating clearing house (i.e. part of an ACP), first clearing house 104 confirms with payment agency 102 that the funds for the transaction are available. Then first clearing house 104 receives s(M) and the part of s(TPH) not due to the second carrier described later, and possibly some extra transaction cost, from payment agency 102. Payment agency 5102 also tells first clearing house 104 a pair of bank order numbers x1 and x2 (although payment agency 102 is not necessarily a bank). Note that this first clearing house can be a purely electronic clearing house, i.e. it could be just a computer handling transactions and order numbers, etc.

The ZIP code (or more generally some zoning code) and the name of payment agency 102 will be assumed to be recognizable parts of (or decoded easily from) both x1 and x2. An essential part of the invention is that a clearinghouse replaces x1 by x2. This breaks the links between the merchant and the company which delivers the goods to the customer.

Here and in the rest of the description, we assume that proper receipts(electronic or otherwise) are obtained by relevant parties in exchange for any information, money, and/or goods being transferred. We also say money is transferred in some cases when it is only allocated. In the case the customer 101 wants the delivery to be made at some address or to some intermediary or receiving agent protecting her/his anonymity, the customer 101 calls payment agency 102 after calling merchant 103 in order to get the bank transaction number x2 using the pair (c, t and p. Payment agency 102 then contacts the receiving address 111 of customer 101 to give the pair (c, t) and the number x2: there might be some extra cost associated to all that, which is paid for by the customer 101 and included in s(TPH). In general x1 and x2 need only to be communicated to the customer 101 when there are delivery problems.

After terminating the dialog with payment agency 102, first clearing house 104 tells merchant 103 that the transaction can be honored, and transfer s(M) and some part of s(TPH) to merchant 103: the details of how each party gets paid need not be universal and will not be discussed. First clearing house 104 also tells merchant 103 the first bank order number x1, which merchant 103 will then attach to each package related to the transaction. Merchant 103 then lets first clearing house 104 know how to contact second clearing house 107.

Then first clearing house 104 communicates the pair of numbers(x1, x2) to second clearing house 107.

When the packages are ready, and have been labeled in such a manner that neither the merchant 103 nor the products involved in the buy can be recognized, the merchant 103 transfers all packages 105 labeled with first bank order number x1 to the first carrier 106: the merchant 103 may well be that carrier without compromising the anonymity of the customer.

The first carrier 106 delivers the packages 105 to the second clearing house 107. Once the packages 105 are received, second clearing house 107 replaces x1 with x2, and makes sure x1 cannot be read from the package. For a higher quality service, second clearing house 107 could add an extra packaging or box to each package or all the packages collectively, and seal it to prevent tampering with its contents or disclosure of information about its contents. Such extra service could be advertised by second clearing house 107 and by the merchant 103 using such clearing house.

One can assume that carrier 106 gets paid by merchant 103, while second clearing house 107 has to be paid by first clearing house 104 (or at worst payment agency 102) from a portion of s(TPH): notice that clearing houses 104 and 107 can belong to the same company without reducing the security of the system.

Once the second bank order number x2 has been added to the packages(as shown at block 108), second clearing house 107 transfers them to second carrier 109. The second carrier 109 contacts the payment agency 102 (whose name is part of second bank order number x2), to claim its money and to get the address corresponding to the second bank order number x2. The packages labeled with second bank order number x2 are then transformed into packages with full address(as shown at block 110): In case the customer receiving address is not a personal address(or a business address with a person's name attached), the second bank order number x2 will remain attached to the packages.

Second carrier 109 then delivers packages 110 to the customer receiving address 111. If needed, customer 101 goes to receiving address 111 to get the packages using second bank order number x2 and the number pair (c, t).

Figure 2:
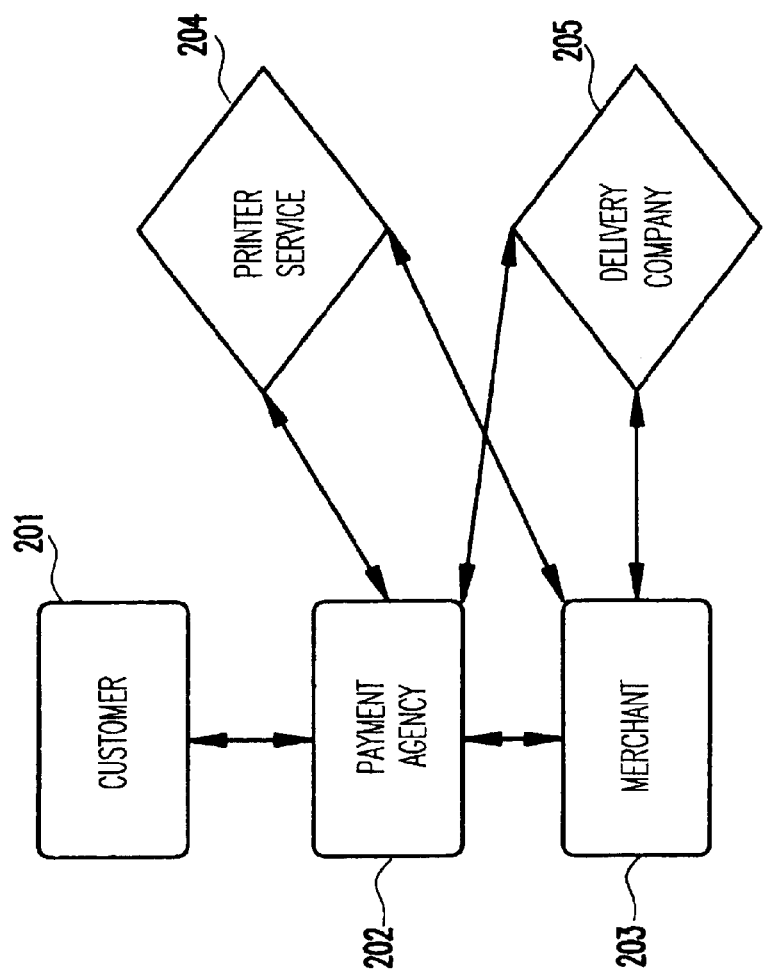
FIG. 2 is a flow chart of the preliminary phase of commerce in accordance with the invention, where all protocols are established.

With reference to FIG. 2 we will now describe the details of this invention in an alternate preferred embodiment which uses encryption rather than clearing houses. For the purposes of description, it is assumed that the payment agency is a credit card company. In this case the customer usually accepts the fact that the payment agency has some knowledge of the customer's purchases. It will be shown how other payment agencies can guaranty increased anonymity, but at the price of less convenience for the customer. The preliminary phase where all protocols are established is organized as follows.

The customer 201 receives a series of numbers for remote buys from the payment agency 202, and can limit in advance the list of merchants which might be involved in future transactions. For additional anonymity, the customer can give cash and a non-revealing address to payment agency 202 in exchange for numbers(customer, transaction private, privacy) and a receipt. The payment agency 202 can also serve as address of the customer 201 until the buy and delivery are terminated.

The payment agency 202 establishes protocols for the exchange of information. These protocols are to be used at each sale with the merchant 203 participating in an ACP. These protocols can often be established when a first customer of payment agency 202 becomes a customer of merchant 203. Payment agency 202 gives the public part of a public key/private key pair (for example, following the RSA protocol as described in U.S. Pat. No. 4,405,829, or using other cryptographic techniques, such as those described in "Handbook of Applied Cryptography," by Alfred J. Menezes, Paul C. van Oorschot and Scott A. Vanstone, CRC Press, 1997) to merchant 203. Also, merchant 203 gives payment agency 202 remote access to a printer which will be used to print address labels for joint customers.

The merchant 203 chooses a printer service company 204 and delivery services company 205.

In a first option, the payment agency 202 contacts the printer service company 204 and gives it the secret encoding key (not necessarily the "private key" of the key pair mentioned earlier). In a second option, the payment agency 202 contacts delivery company 205 and gives it the secret encoding key. Notice that any given payment agency 202 can simultaneously use first and second options with different customers.

Figure 3:
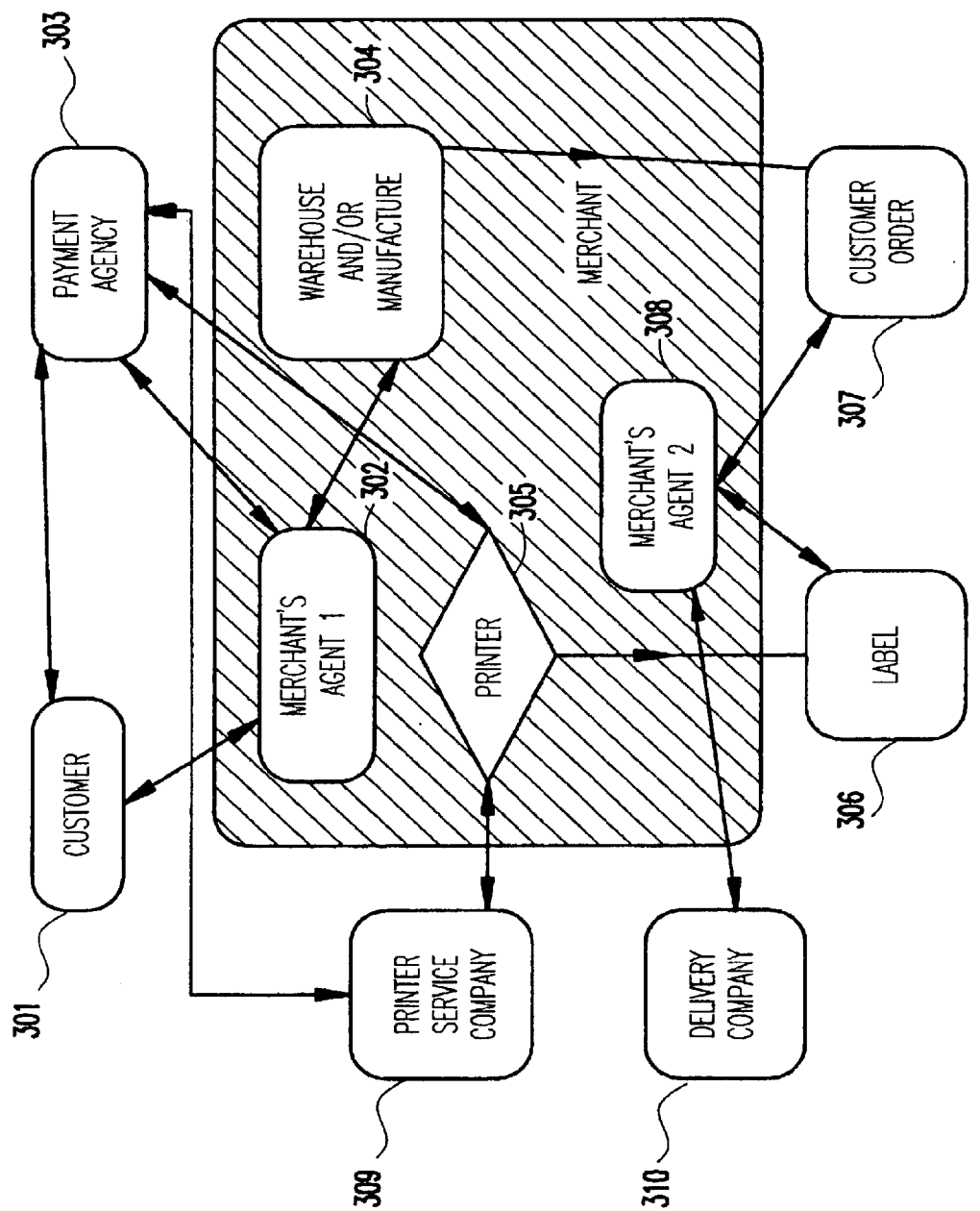
FIG. 3 is a flow chart showing interactions with the merchant, and detail within the merchant link.

With reference to FIG. 3, we will now explain in detail the process as viewed at the merchant 311. When the transaction and the transfer of goods takes place the customer 301 contacts a personal or electronic agent of the merchant at 302, and places the order anonymously. The customer gives some identification numbers supplied by her/his payment agency 303, and receives the order number corresponding to the transaction being handled. Merchant's agent 302 gets confirmation from payment agency 303 and sends payment agency 303 the order number, and possibly the number of labels to be printed to ship that order. In case customer 301 wants the shipment sent to an alternate address, payment agency 303 obtains from customer 301 a shipping address corresponding to the order number. Merchant's agent 302 transmits the order and order number to the manufacturing/warehouse team(s) 304 in charge of preparing the order 307, while payment agency 303 instructs the printer 305 (in the locale of the merchant) to print as many labels 306 as needed for the order 307.

Figure 4:
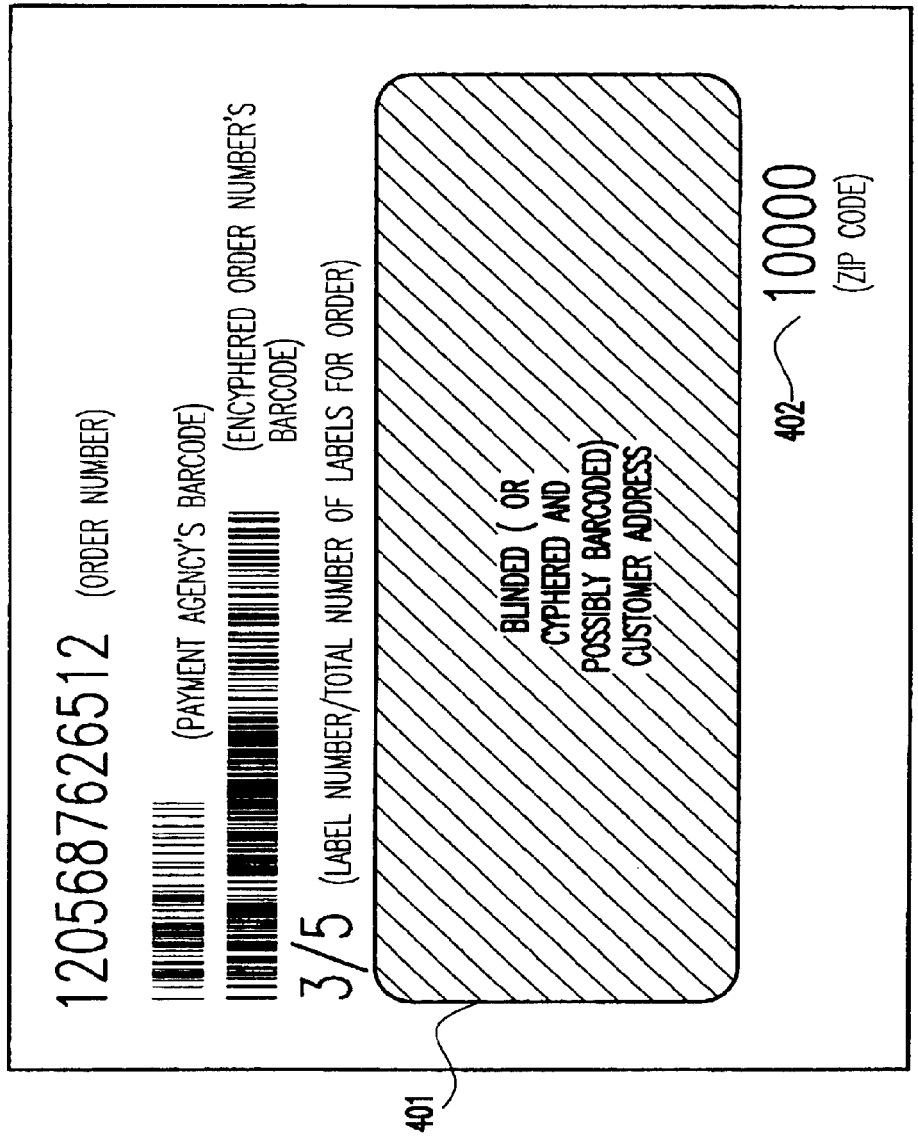
FIG. 4 shows the structure of labels in accordance with the invention.

The structure of the label 306 is detailed in FIG. 4. While the second agent 308 of the merchant can use the public key to verify that the label(s) 306 corresponds to the order 307, the identity and address of the customer are not readable (although the zipcode 402 or other area information may be disclosed for routing efficiency), being blinded in option 1 and encoded in option 2 (with a secret encoding key that the delivery company can use to decode and print the address) 401. In case of problems with printer 305, only the printer service company 309 can intervene, and could furnish labels 306 in emergencies after contacting the payment agency 303. When the order 307 and its label(s) 306 are reunited the package(s) is handed to the delivery company 310 which acknowledges receipt, so that all parties can trace the source of any problems which occur.

There are modifications possible to this invention, obvious to anyone skilled in the art. For example, the merchant 311 could simply print a label with the order number corresponding to the customer order 307 and attach it to the package and give it to the delivery agency 310. The delivery agency 310 could then contact the payment agency 303 with the order number and obtain a shipping address which can be printed and attached to the package. While the invention has been described in terms of a preferred embodiment and an alternate embodiment, those skilled in the art will recognize that the invention can be practiced with modification within the spirit and scope of the appended claims.

Having thus described our invention, what we claim as new and desire to secure by Letters Patent is as follows:

1. A method of conducting commercial transactions while preserving customer anonymity and without disrupting merchant distribution channels, comprising the steps of:

establishing protocols among potential participants in said transactions, said protocols including an Anonymous Customer Protocol; and executing said transactions in accordance with said protocols, wherein said protocols provide that no participant except the customer has complete information necessary to link said customer to said merchant, wherein said execution step further comprises the steps of:

anonymously verifying payment to a merchant for goods ordered by a customer; and anonymously shipping said goods from said merchant to a receiving address provided by said customer, and wherein said verifying step further comprises the steps of:

issuing to said customer by a payment agency of control numbers, including a customer number and a transaction private number;

ordering said goods by said customer from said merchant, wherein said customer provides said merchant with said customer number, said transaction private number and the identity of said payment agency;

confirming by said merchant with said payment agency that funds for delivery of said goods are available, said confirmation using said customer number and said transaction private number, and wherein said confirming step is accomplished via a first clearing house, whom said merchant contacts and provides with said customer number and said transaction private number, and wherein said shipping step further comprises the steps of:

providing by said customer to said payment agency said receiving address for said goods;

generating by said payment agency a first bank order number and a second bank order number, said bank order numbers being associated by said payment agency with said receiving address;

providing said first bank order number to said merchant, and providing said second bank order number to a second clearing house;

packaging by said merchant of said goods in such a manner that neither the identity of said merchant nor the identity of said goods can be recognized;

applying by said merchant of said first bank order number to said packaging;

delivering said package to said second clearing house, who replaces on said package said first bank order number with said second bank order number; and delivering said package to said receiving address, said receiving address being determined from said second bank order number.

2. The method of claim 1, wherein said merchant delivers said package to said second clearing house.

3. The method of claim 1, wherein said second clearing house adds an extra wrap to said package.

4. The method of claim 1, wherein said first clearing house and said second clearing house are the same company.

5. A method of conducting commercial transactions while preserving customer anonymity and without disrupting merchant distribution channels, comprising the steps of:

establishing protocols among potential participants in said transactions, said protocols including an Anonymous Customer Protocol; and executing said transactions in accordance with said protocols, wherein said protocols provide that no participant except the customer has complete information necessary to link said customer to said merchant, wherein said execution step further comprises the steps of:

anonymously verifying payment to a merchant for goods ordered by a customer; and anonymously shipping said goods from said merchant to a receiving address provided by said customer; and wherein said verifying step further comprises the steps of:

issuing to said customer by a payment agency of control numbers, including a customer number and a transaction private number;

ordering said goods by said customer from said merchant, wherein said customer provides said merchant with said customer number, said transaction private number and the identity of said payment agency;

confirming by said merchant with said payment agency that funds for delivery of said goods are available, said confirmation using said customer number and said transaction private number, and wherein said ordering step provides an order number from said merchant to said customer, and wherein said shipping step further comprises the steps of:

providing by said customer to said payment agency said receiving address for said goods;

obtaining by said payment agency a public key and a private key of a public-key/private-key pair, said public key being used to encode said receiving address on a shipping label;

providing said public key to said merchant, and providing said private key to a delivery company;

packaging by said merchant of said goods in such a manner that neither the identity of said merchant nor the identity of said goods can be recognized;

applying by said merchant of said encoded shipping label to said packaging;

delivering said package to said receiving address, said receiving address being determined from said shipping label by said delivery company using said private key.

6. A method of conducting commercial transactions while preserving customer anonymity and without disrupting merchant distribution channels, comprising the steps of:

establishing protocols among potential participants in said transactions, said protocols including an Anonymous Customer Protocol; and executing said transactions in accordance with said protocols, wherein said protocols provide that no participant except the customer has complete information necessary to link said customer to said merchant, wherein said execution step further comprises the steps of:

anonymously verifying payment to a merchant for goods ordered by a customer; and anonymously shipping said goods from said merchant to a receiving address provided by said customer, and wherein said verifying step further comprises the steps of:

issuing to said customer by a payment agency of control numbers, including a customer number and a transaction number;

ordering said goods by said customer from said merchant, wherein said customer provides said merchant with said customer number, said transaction private number and the identity of said payment agency;

confirming by said merchant with said payment agency that funds for delivery of said goods are available, said confirmation using said customer number and said transaction private number, and wherein said control numbers include a privacy number usable by said customer to inquire about said order, and in particularly to obtain a second bank order number from said payment agency.

7. An apparatus for conducting commercial transactions while preserving customer anonymity and without disrupting merchant distribution channels, comprising:

means for establishing protocols among potential participants in said transactions, said protocols including an Anonymous Customer Protocol; and means for executing said transactions in accordance with said protocols, wherein said protocols provide that no participant except the customer has complete information necessary to link said customer to said merchant, wherein said execution means further comprises:

means for anonymously verifying payment to a merchant for goods ordered by a customer; and means for anonymously shipping said goods from said merchant to a receiving address provided by said customer, and wherein said verifying means further comprises:

means for issuing to said customer by a payment agency of control numbers, including a customer number and a transaction private number;

means for ordering said goods by said customer from said merchant, wherein said customer provides said merchant with said customer number, said transaction private number and the identity of said payment agency;

means for confirming by said merchant with said payment agency that funds for delivery of said goods are available, said confirmation using said customer number and said transaction private number, and wherein said confirming means is executed via a first clearing house, whom said merchant contacts and provides with said customer number and said transaction private number, and wherein said shipping means further comprises:

means for providing by said customer to said payment agency said receiving address for said goods;

means for generating by said payment agency a first bank order number and a second bank order number, said bank order numbers being associated by said payment agency with said receiving address;

means for providing said first bank order number to said merchant, and providing said second bank order number to a second clearing house;

means for packaging by said merchant of said goods in such a manner that neither the identity of said merchant nor the identity of said goods can be recognized;

means for applying by said merchant of said first bank order number to said packaging;

means for delivering said package to said second clearing house, who replaces on said package said first bank order number with said second bank order number; and means for delivering said package to said receiving address, said receiving address being determined from said second bank order number.

8. The apparatus of claim 7, wherein said merchant delivers said package to said second clearing house.

9. The apparatus of claim 7, wherein said second clearing house adds an extra wrap to said package.

10. The apparatus of claim 7, wherein said first clearing house and said second clearing house are the same company.

11. An apparatus for conducting commercial transactions while preserving customer anonymity and without disrupting merchant distribution channels comprising:

means for establishing protocols among potential participants in said transactions, said protocols including an Anonymous Customer Protocol; and means for executing said transactions in accordance with said protocols, wherein said protocols provide that no participant except the customer has complete information necessary to link said customer to said merchant, wherein said execution means further comprises:

means for anonymously verifying payment to a merchant for goods ordered by a customer; and means for anonymously shipping said goods from said merchant to a receiving address provided by said customer, and wherein said verifying means further comprises:

means for issuing to said customer by a payment agency of control numbers, including a customer number and a transaction private number;

means for ordering said goods by said customer from said merchant, wherein said customer provides said merchant with said customer number, said transaction private number and the identity of said payment agency;

means for confirming by said merchant with said payment agency that funds for delivery of said goods are available, said confirmation using said customer number and said transaction private number, and wherein said ordering means provides an order number from said merchant to said customer, and wherein said shipping means further comprises:

means for providing by said customer to said payment agency said receiving address for said goods;

means for obtaining by said payment agency a public key and a private key of a public-key/private-key pair, said public key being used to encode said receiving address on a shipping label;

means for providing said public key to said merchant, and providing said private key to a delivery company;

means for packaging by said merchant of said goods in such a manner that neither the identity of said merchant nor the identity of said goods can be recognized;

means for applying by said merchant of said encoded shipping label to said packaging; and means for delivering said package to said receiving address, said receiving address being determined from said shipping label by said delivery company using said private key.

12. An apparatus for conducting commercial transactions while preserving customer anonymity and without disrupting merchant distribution channels, comprising:

means for establishing protocols among potential participants in said transactions, said protocols including an Anonymous Customer Protocol; and means for executing said transactions in accordance with said protocols, wherein said protocols provide that no participant except the customer has complete information necessary to link said customer to said merchant, wherein said execution means further comprises:

means for anonymously verifying payment to a merchant for goods ordered by a customer; and means for anonymously shipping said goods from said merchant to a receiving address provided by said customer, and wherein said verifying means further comprises:

means for issuing to said customer by a payment agency of control numbers, including a customer number and a transaction private number;

means for ordering said goods by said customer from said merchant, wherein said customer provides said merchant with said customer number said transaction private number and the identity of said payment agency;

means for confirming by said merchant with said payment agency that funds for delivery of said goods are available, said confirmation using said customer number and said transaction private number, and wherein said control numbers include a privacy number usable by said customer to inquire about said order, and in particular to obtain a second bank order number from said payment agency.

* * * * *